United States Patent [19]

Danielian et al.

[11] Patent Number: 5,453,838
[45] Date of Patent: Sep. 26, 1995

[54] SENSING SYSTEM WITH A MULTI-CHANNEL FIBER OPTIC BUNDLE SENSITIVE PROBE

[75] Inventors: G. Danielian, Moscow, Russian Federation; W. Neuberger, Monchengladbach, Germany

[73] Assignee: Ceram Optec Industries, Inc., East Longmeadow, Mass.

[21] Appl. No.: 261,676

[22] Filed: Jun. 17, 1994

[51] Int. Cl.⁶ .............................. G01B 11/30; H01J 5/16
[52] U.S. Cl. .................... 356/371; 356/373; 250/227.11; 250/227.28; 250/231.1; 385/115
[58] Field of Search ..................... 356/371, 373, 356/375, 372, 445, 446; 250/227.11, 227.21, 227.28, 231.1, 561; 385/115, 116, 121

[56] References Cited

U.S. PATENT DOCUMENTS

| | | |
|---|---|---|
| 3,327,584 | 6/1967 | Kissinger . |
| 3,430,057 | 2/1969 | Genähr .................... 250/227.28 |
| 3,484,614 | 12/1969 | Tobey et al. ............... 250/227.28 |
| 3,919,546 | 11/1975 | Lutus . |
| 4,247,764 | 1/1981 | Kissinger . |
| 4,254,331 | 3/1981 | Dorman et al. . |
| 4,376,890 | 3/1983 | Engström et al. ............ 250/231.1 |
| 4,488,813 | 12/1984 | Kissinger et al. . |
| 4,674,882 | 6/1987 | Dorman et al. . |
| 4,692,611 | 9/1987 | Hoogenboom . |
| 4,701,610 | 10/1987 | Hoogenboom . |
| 5,017,772 | 5/1991 | Hafle ..................... 250/227.28 |

FOREIGN PATENT DOCUMENTS

| | | | |
|---|---|---|---|
| 0050907 | 2/1989 | Japan ................ 356/373 |
| 0016405 | 1/1990 | Japan ................ 356/371 |
| 1631496 | 2/1991 | U.S.S.R. ............. 385/115 |

*Primary Examiner*—Hoa Q. Pham
*Attorney, Agent, or Firm*—Bolesh J. Skutnik; Kenneth Glynn

[57] ABSTRACT

A sensing system with a multichannel fiber optic bundle (MFOB) sensitive probe for measuring displacement, vibrations, roughness and two angles between a probe tip and light reflected target. The MFOB sensitive probe includes three branches of transmitting and receiving channels. The tip end of the MFOB is arranged in a rectangular 3*3 matrix formation. The other end of the MFOB includes eleven optical tips and connectors for optically connecting the tip of each channel, through optical filters, with light sensors and light sources. The sensing system further includes an electronic portion, having a thermostabilized box, an analog portion of an electronic module, a multifunction input/output board for use with a computer, and a controller for programmably controlling and measuring all parameters using computer analysis.

7 Claims, 13 Drawing Sheets

1st SCAN

2nd SCAN

OUTPUT SIGNAL
(from structure 52)

3rd SCAN

10 μm

SENSING SYSTEM WITH A MULTI-CHANNEL FIBER OPTIC BUNDLE SENSITIVE PROBE

BACKGROUND OF THE INVENTION

1. Field of the Invention

This invention relates to a multifunction fiber optic bundle sensitive probe, and, more particularly, to a sensing system for the fiber optic probe that provides automatic adjustment of the changes in the intensity of the reflected light.

Fiber optic probes are flexible contactless sensors, which use light beams transmitted from light sources through bundles of optical fibers to reflected targets. Part of the light beam is reflected off the target and returned along receiving fibers in the bundle back to a light intensity sensor or sensors in the probe module. The intensity of the reflected light is a function of: the distance, Z, and two inclination angles, and β, between the probe tip and target; the luminous reflectance, $R_o$, between the target and light beam wavelength; an average light intensity, $I_o$, and the light intensity angle distribution of the light sources; and the average roughness of the target surface.

The output signals of the light sensors can provide a highly precise measurement of the distance, or more importantly, of the changes in displacement, vibrations, small inclination angles or average roughness. However, because of variations in certain operating parameters such as luminous reflectance of the target, changes in intensity of the light sources, temperature changes, and other factors that influence light conductivity, it is necessary to separate the information about the various parameters using different channels, and to make adjustments through the sensing system if any of these factors change.

This and other objects of the invention are attained in an embodiment having a multichannel fiber optic bundle (MFOB) with a sensitive probe tip with three branches of two receiving types of channels and one transmitting channel, which provides a method of sensing whereby four main signals are directed to measuring various parameters and two signals are directed to compensation and roughness measurements.

2. Prior Art Statement

Many fiber optic probes have been designed.

U.S. Pat. Nos. 4,254,331 to Dorman et al. and 4,247,764 to Kissinger describe fiber optic instruments for measuring dynamic changes in the gap between a probe tip and a target, the instrument having a light source, two sensors and one light conducting cable. The device incorporates the regulation of equal mean intensity at the reflected light sensor, despite changes in target reflectivity and cable light conductance.

U.S. Pat. No. 3,327,584 to Kissinger describes a fiber optic probe which is highly sensitive and unaffected by temperature or environment. It senses the position of a test object and uses different diameters and locations of two light receiving groups to compensate for variations.

U.S. Pat. No. 4,488,813 to Kissinger describes a device that employs dual probes to create an output signal having a gap calibration which is independent of surface reflectance.

U.S. Pat. No. 3,919,546 to Lutus describes a photoelectric apparatus for tracking a periodically moving object in order to provide an accurate electrical signal corresponding to the motion of the object. The device incorporates a feedback path that compensates for the drift in the photo-cell and light source caused by ambient temperature changes, foreign matter and aging.

U.S. Pat. No. 4,701,610 to Hoogenboom describes a fiber optic proximity sensor for narrow targets with reflectivity compensation. The device generates an output signal formula from two sensor signals and uses a scaling constant, determined from the response characteristics.

U.S. Pat. No. 4,692,611 to Hoogenboom describes a fiber optic proximity sensor with feedback servo-imaging means, with two bifurcate fiber optic bundles arranged in parallel with the reflected light from the target being transmitted to two separate sensors. The output difference of the sensors is used to derive a control signal for tracking the target, then moving the imaging means in response.

U.S. Pat. No. 4,674,882 to Dorman et al. describes a precision optical displacement measuring instrument which utilizes a servo controlled fiber optic sensor to measure the displacement of the target, such that the fiber optic sensor and lens assembly are vibrated toward and away from the target.

However, none of these inventions discloses a fiber optic bundle arranged with a plurality of receiving and transmitting channels in a 3*3 matrix formation for multichannel transmitting and receiving, and to a sensing system used therewith for automatically compensating for changes in the intensity of the light beam.

SUMMARY OF THE INVENTION

The present invention involves a multi-channel fiber optic bundle, and more importantly, a multifunction sensing system which utilizes such fiber optic bundle, wherein the displacement, vibration, inclination angles and/or roughness are sensed simultaneously. The apparatus of this invention automatically separates these parameters and compensates for the changes in the intensity of the light beam. The output signals of the displacement, vibrations and angles are essentially independent of temperature, target reflectivity, and external illumination, and automatically compensate for factors which influence the transmission of light through the sensing system (such as roughness of reflected target and fiber defects or the radius of curvature of the bundle). It also provides the possibility of long term multifunction computer data analysis and automatically compensates for different target reflectivity.

One embodiment of the present invention comprises a multichannel fiber optic bundle (MFOB) with a sensitive probe tip having at least three types of transmitting and receiving ends bundled together in a 3*3 matrix formation.

BRIEF DESCRIPTION OF THE DRAWINGS

The present invention is more fully understood when the instant specification is taken in conjunction with the drawings which are appended hereto, wherein.

DETAILED DESCRIPTION OF THE DRAWINGS

The present invention discloses a multifunction sensing system which utilizes a multichannel fiber optic bundle (MFOB) 1 as shown in FIGS. 1a–3. The MFOB comprises three branches two of which 4,5 have receiving channels and the third 3 having transmitting channels. The first 4 receiving branch has four channels 6,7,8,9 and the second 5 receiving branch has two channels 15,16. The third transmitting branch is comprised of five channels 10,11,12,13, and 14.

Figure 2:
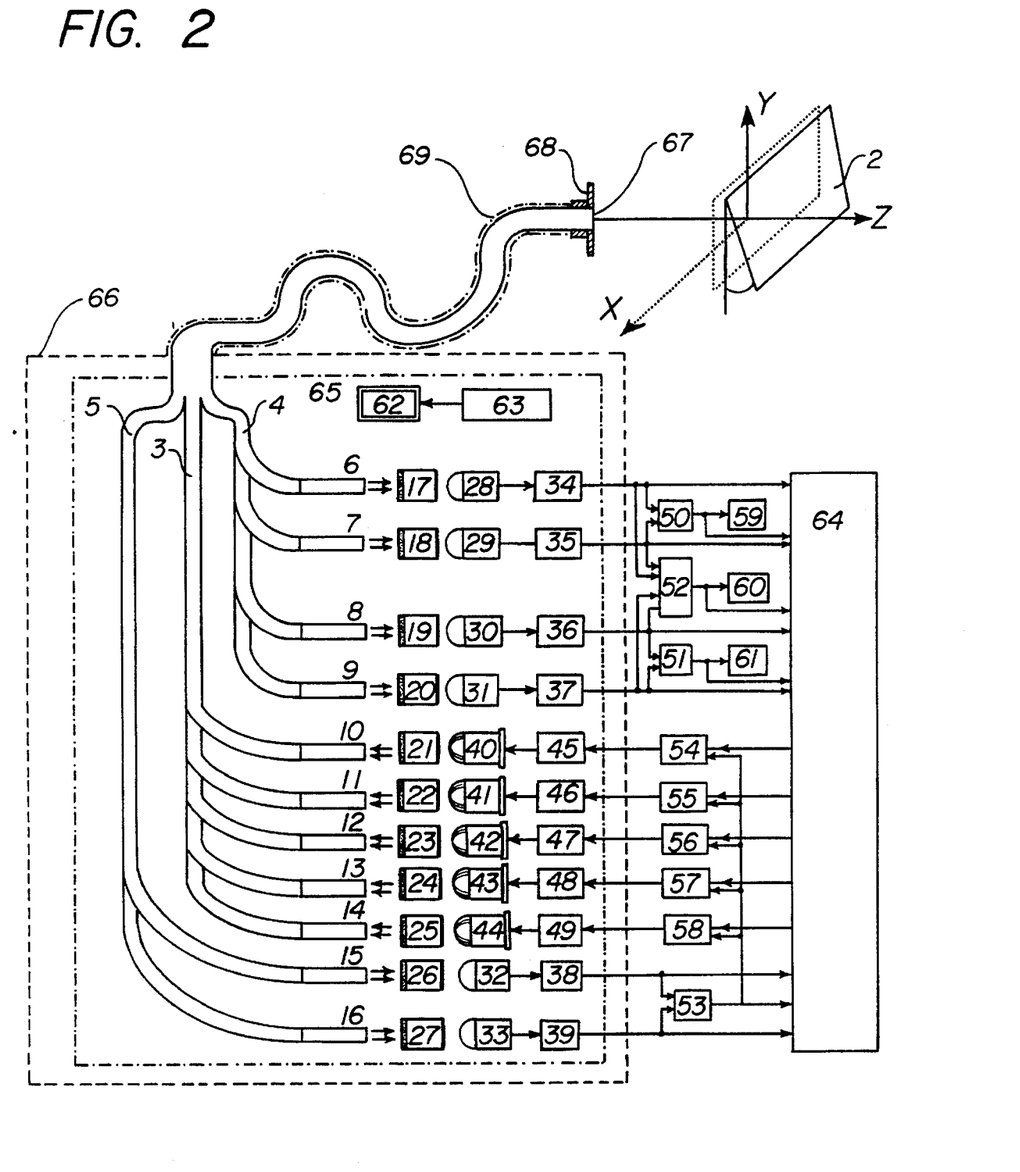
FIG. 2 shows a schematic of one embodiment of the sensor and multichannel fiber optic bundle of the present invention.

As seen in FIG. 2, the four receiving channels 6–9 of the first branch 4 and two receiving channels 15,16 of the second branch 5 are optically connected to optical filters or day light filters 17,18,19,20,26 and 27 which are connected to light sensors 28–33. In operation, the light from light sources 40–44 is conducted along respective optical filters 21–25 from the five transmitting channels of the third branch 3 to the probe tip 67 of the MFOB 1, where it is transmitted to a reflected target 2.

Figure 3:
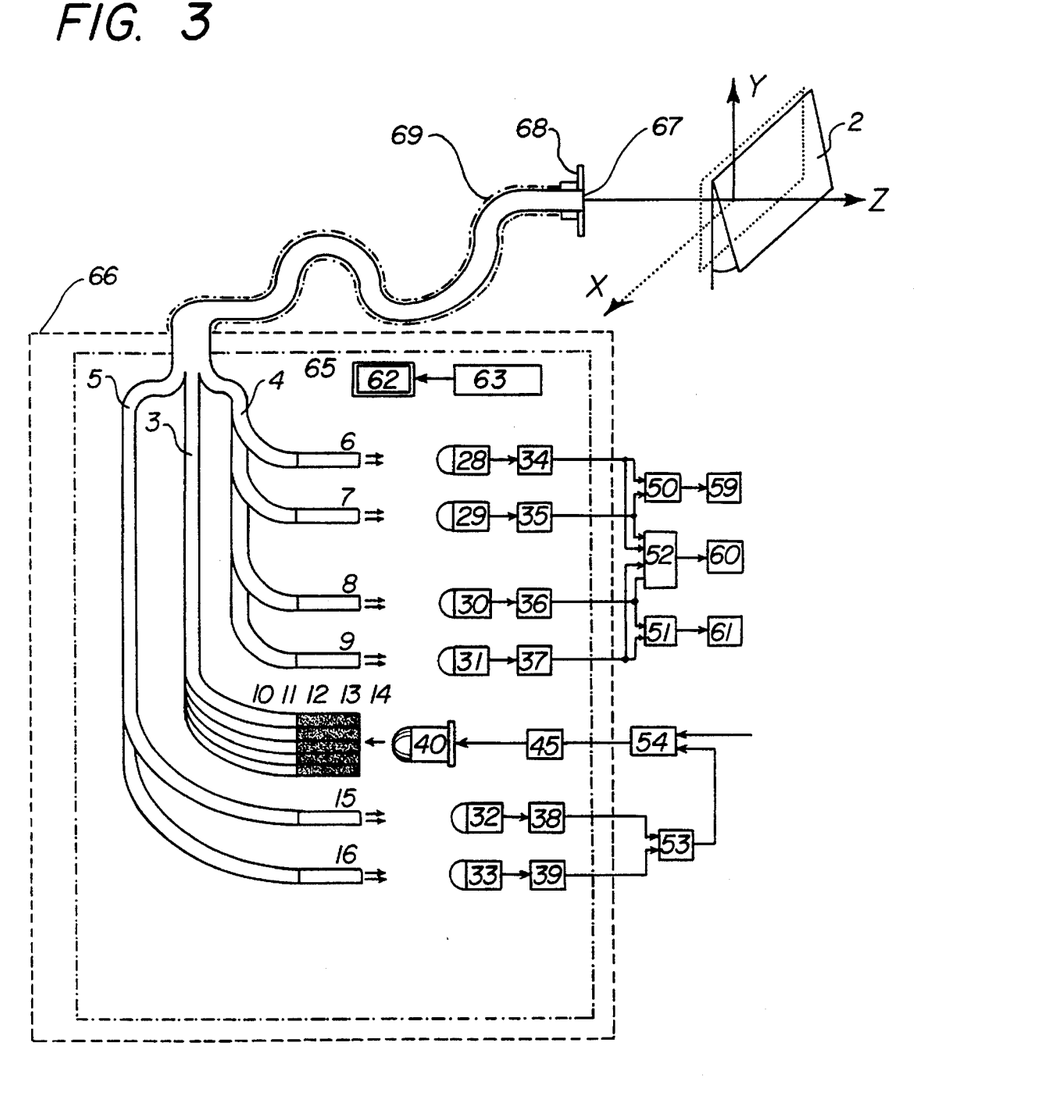
FIG. 3 shows a schematic of an alternative embodiment of the sensor and multichannel fiber optic bundle.

FIG. 3 shows a device similar to that described above using FIG. 2, however, the light sources 40–44 of FIG. 2 are replaced by a single light source 40 in FIG. 3. The modification of FIG. 3 is restrictive, but shows the possibility for changing this electronic part and allowing one big power laser diode, for example, to be simply controlled with small amounts of noise and small fluctuations in the light beams. The device of FIG. 2, on the other hand, is designed to handle pulsed light sources. In that case, receiving channels can be illuminated one after another such that different relations are established, for example: (A1–A6) version 1 for channel 10—on/channels 11–14—off; version 2 for channel 11—on/channels 10, 12–14—off; version 3 for channel 10,11—on/channel 12–14—off.

In either case, the reflected light is received by the receiving channels 6–9,15,16 and is analyzed as follows. (The reflected light is amplified and converted to an electrical signal.) A set of amplifiers 34–39 is connected by inputs with the respective light sensors 28–33. These amplifiers aid in the conversion of the light signals into electrical signals $A_1$–$A_6$ (not shown).

The signals $A_1$–$A_4$ that arise from the four light sensors 28–31 and the amplifiers 34–37 follow one path (angle measurement). While the signals $A_5$ and $A_6$ that arise from the amplifiers 38,39 of the receiving channels follow a second path. The signals $A_1$–$A_4$ that are connected to two submitting elements 50 and 51 which are intended as two angle signals $A_\alpha$ and $A_\beta$ (which are the angle measurements) are determined by the equations:

$$A_\alpha = (K_1 A_1 - K_2 A_2) K_\alpha = \phi_1(\alpha) \tag{1}$$

if $\alpha \leq \alpha max$ $$A_\beta = (K_3 A_3 - K_4 A_4) K_\beta = \phi_2(\beta) \tag{2}$$

if $\beta \leq \beta max$, where K represents an amplification constant.

Signals $A_1$–$A_4$ are also connected to a summary element 52 for displacement measuring. The output signal from the summary element, represented as $A_z$, is the linear function below of $A_1$–$A_4$:

$$A_z = K_{1z} A_1 + K_{2z} A_2 + K_{3z} A_3 + K_{4z} A_4 \tag{3}$$

When Az is independent of the change in the $\alpha$ and $\beta$ angles, the following condition holds, where:

$$K_{1z} A_1 = K_{2z} A_2 = K_{3z} A_3 = K_{4z} A_4.$$

The signals $A_5$, $A_6$ from amplifiers 38, 39 of the receiving channels 15, 16 are connected with inputs of summary element 53 which is involved in the light intensity measuring and control, and creates a signal $A_o$ for light intensity feedback control, such that:

$$A_o = (K_5 A_5 + K_6 A_6) K_c. \tag{4}$$

The light intensity from the light source 40–44 is dependent upon the electrical signals that come from the five amplifiers 45–49. These, in turn, are controlled by light regulators 54–58 which are designed with two inputs, connected to the output of the summary element 53 for light adjusting.

The analog signals $A_\alpha$, $A_\beta$ from the two submitting elements 50,51 and the analog signal $A_z$ from the summary element 52 are connected to zero or analog signal registrators 59–61. This connection allows the possibility to set up the preliminary distance Zo between the probe tip 67 and the reflected target 2.

A thermosensor 62 with a heating element 63 is set in a (thermostabilized) part 65 of a thermostabilized box. This box has a special cover 66 which isolates the contents of the box from thermal influences.

All of the output for numerical analysis from elements 63,50,52,51,53, and inputs from elements 54–58 are connected with the input-output board 64 of a computer with at least ten analog-digital converting (ADC) inputs and at least one digital analog converting (DAC) output. These elements provide the system with the capability of numerically analyzing and monitoring the main signals.

A light protector 68 for the MFOB is designed around the probe tip 67 to prevent the receiving channels of the MFOB from being influenced by external light. It is placed on the end of the flexible light protector hose 69 (and serves to protect the small radius of curvature).

Figure 1A:
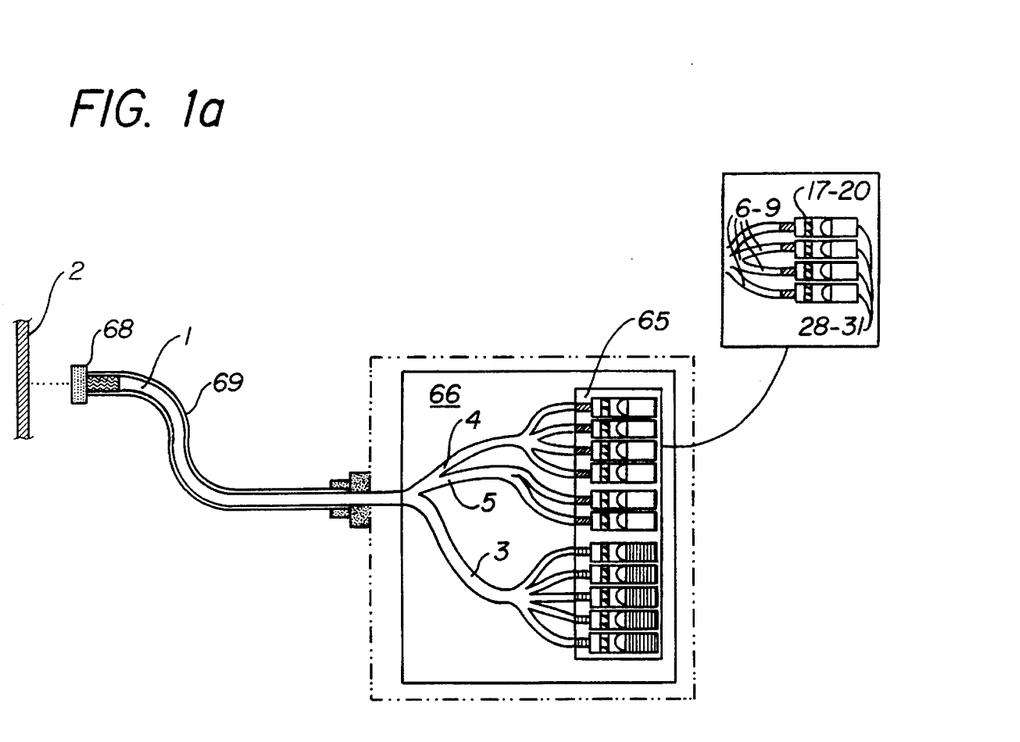
FIG. 1a shows a perspective view of the multichannel fiber optic bundle of the present invention with an exploded view of one of the receiving channel branches.
Figure 1B:
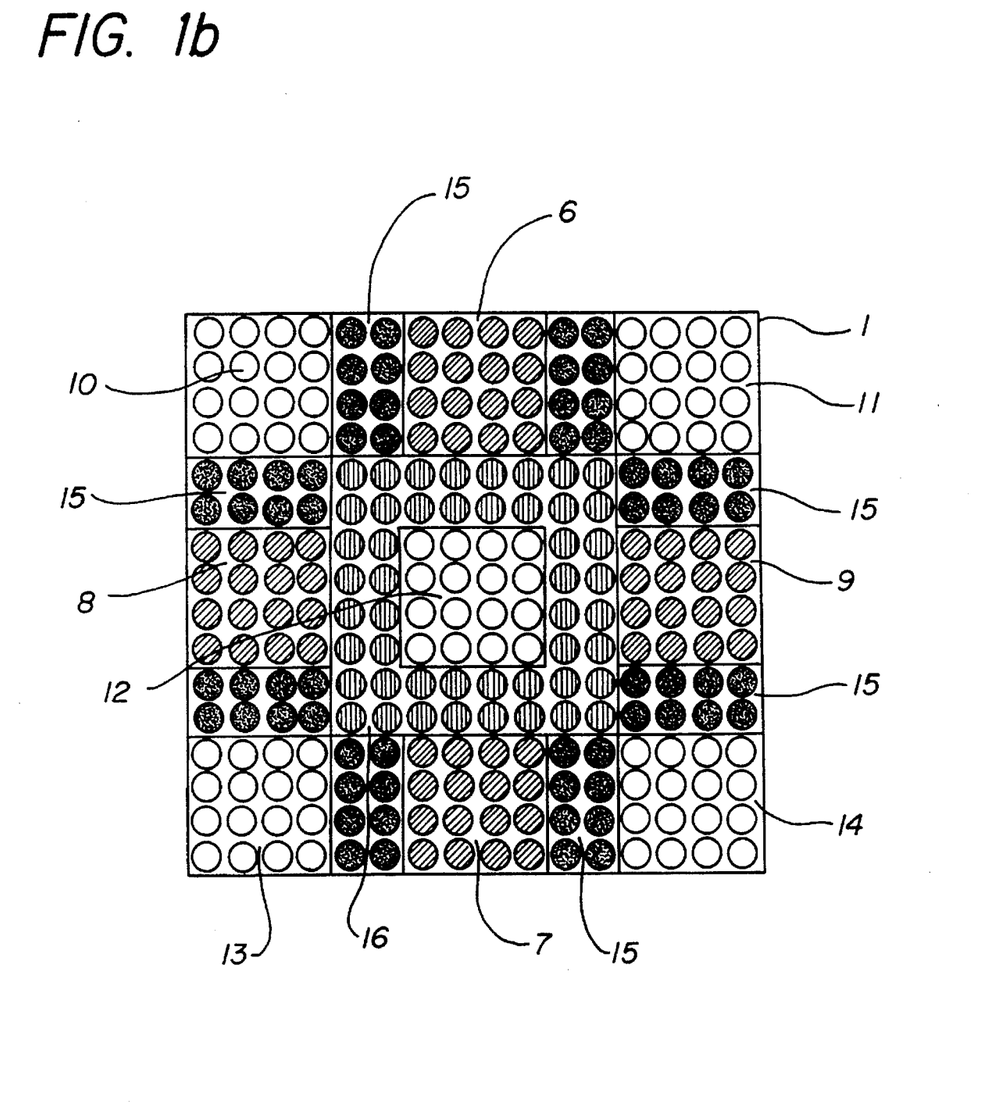
FIG. 1b shows a cross-sectional view of the sensitive probe tip end of the multichannel fiber optic bundle.
Figure 1C:
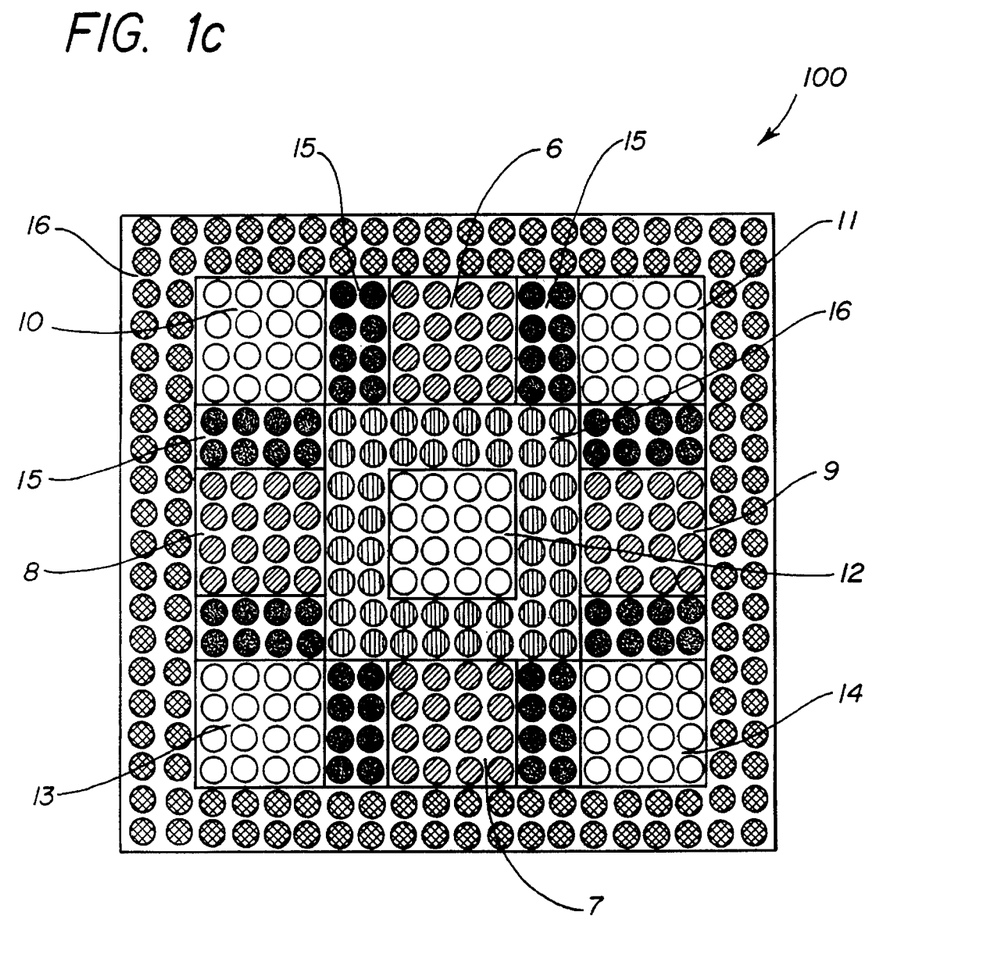
FIG. 1c shows a cross-sectional view of a modification of the sensitive probe tip end of the multichannel fiber optic bundle.

More specifically, the probe tip end of the claimed MFOB 1 comprises a symmetrical arrangement of fibers in a rectangular 3*3 matrix 100 with nine sections 6–14 as shown in FIGS. 1b and 1c. These nine sections 6–14 include a center section of transmitting fibers 12 surrounded by a first supplementary section of inner layer of fibers 16 which are bundled into a first separated receiving channel forming a part of the second branch 5 of the multichannel fiber optic bundle; a plurality of supplementary sections of fibers placed alongside two side boundaries of each of the remaining eight sections 6–11, 13–14 of the 3*3 matrix to form a collection of second separated receiving channels 15 of the second branch 5 of the multichannel fiber optic bundle. The four corner sections and the center section of the 3*3 matrix are occupied by the five separated transmitting sections 10,11,12,13,14 from the third branch 3 of the multichannel fiber optic bundle 1; and the four middle sections of the 3*3 matrix 100, located between two of the respective four corners of the matrix, are occupied by receiving fibers from the four channels 6,7,8,9 of the first branch 4 of the multichannel fiber optic bundle 1.

In addition, as shown in FIG. 1c, an array of receiving channels 16 may surround the boundary of the 3*3 matrix 100. The main purpose for adding a surrounding outer layer (of receiving channels) 16 is to create a difference in the influence from the transmitting sections 10–14 to these receiving channels 16 by allowing the possibility to include a light beam inclinated at a large angle (the angle of maximal numerical aperature). That is, if a reflected target is placed a large distance away from the end of the probe, the angle of incidence will increase. The outer layer of receiving fibers 16 thus allows for an increase in the area of reception, or numerically, a larger linear range in which to operate.

A second end of each of the fibers of said first 15 and second 16 separated receiving channels of said second branch 5 are bundled into at least two separate channels and have means for optical connection to at least two light sensors 32,33. A second end of the fibers of the four channels 6–9 of said first branch 4 have means for optical connection to light sensors 28–31, with the light sensors having means for adjusting 50–53. A second end of the fibers of the five separated transmitting sections 10–14 of the third branch 3 are bundled into between one and five transmitting channels and have means for optical connection to respective light sources 40–44. Means are included 50–64 for programmably controlling, measuring and analyzing data received from said channels. Much of this analysis is shown in the graphs of FIGS. 4a–4d and FIGS. 6–8.

It is necessary to approximate the MFOB structure 1 as a matrix 100 of receiving fibers placed in positions of matrix [i,j] with the same positions of the matrix of the transmitting fibers being labelled as [k,l].

Figure 4A:
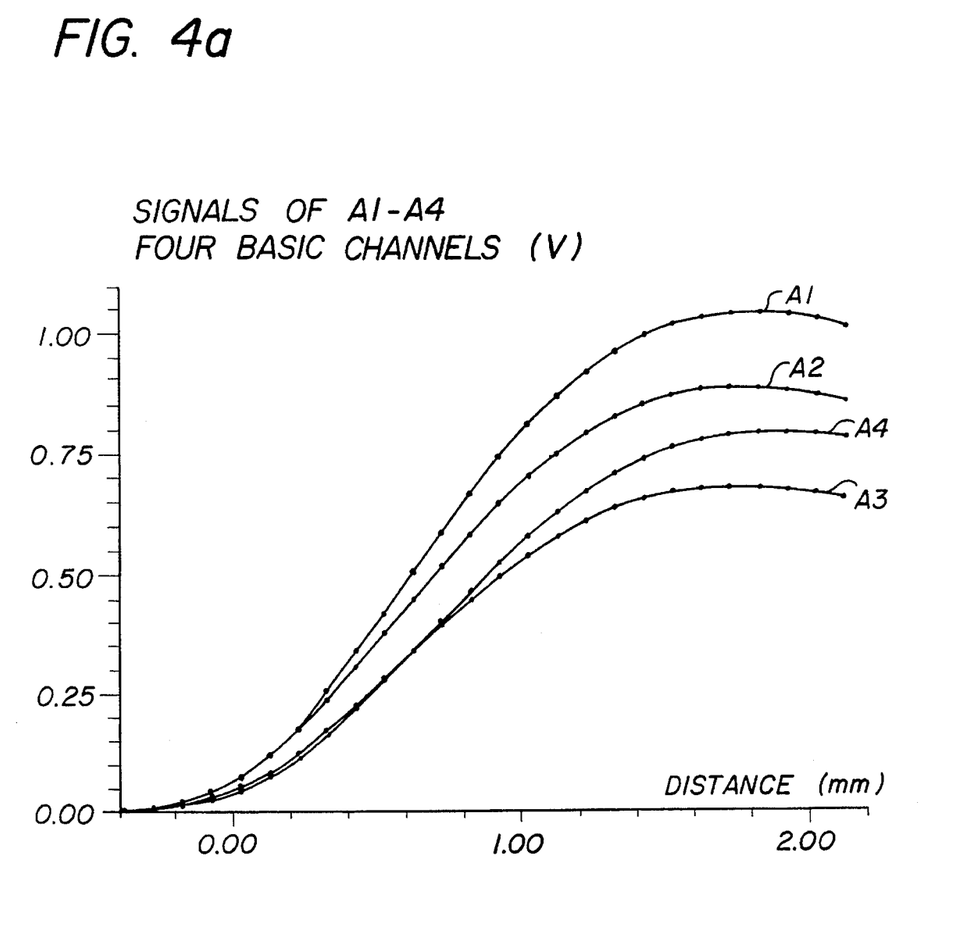
FIG. 4a shows a graph demonstrating the randomization between the signals of four symmetric channels.

The MFOB structure 1 can be optimized for six main signals as shown from the graphs in FIGS. 4a–4d. The features of this curve make it possible to work within the linear range ($Z_o-\Delta Z$, $Z_o+\Delta Z$) of four receiving channels 6–9, with a very small dependence (negative and positive) on the two receiving channels 15,16. FIG. 4a shows a graph of electrical signals A1–A4 (the four basic channels) in volts which come from amplifiers 34–37, respectively. These values are relative and depend from a factor of amplification as follows:

$$A1=[K1* I1+A10]/A1max$$

$$A2=[K2* I2+A20]/A2max$$

$$A3=[K3* I3+A30]/A3max$$

$$A4=[K4* I4+A40]/A4max,$$

where K1–K4 is the amplification, and A10–A40 are the shifts.

Figure 4B:
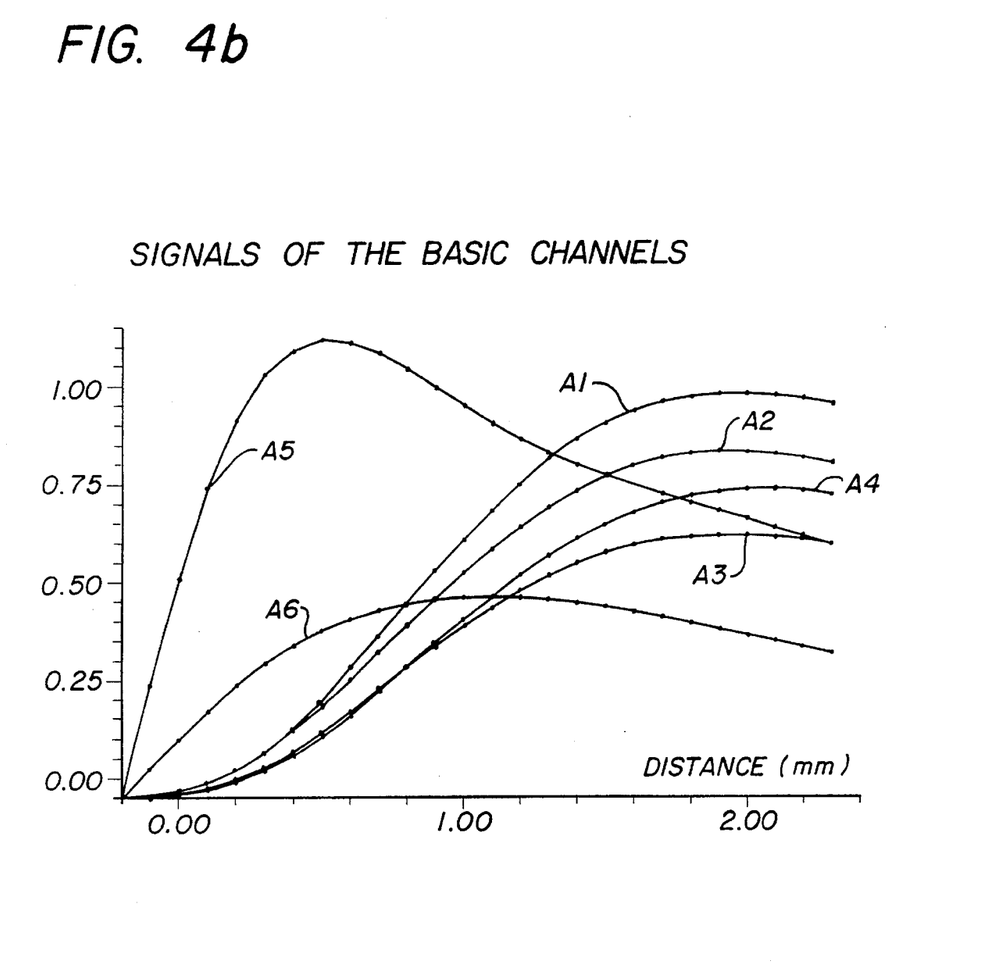
FIG. 4b shows a graph illustrating the basic channel characteristics.

FIG. 4b is similar to FIG. 4a with the addition of signals A5 and A6, where A5 is a relative signal from amplifier 38 and A6 is a relative signal from amplifier 39. The distance on the x-axis is the displacement in the z-direction (as seen in FIG. 2, between the target surface of the sensitive probe 67 and the reflected surface 2).

Figure 4C:
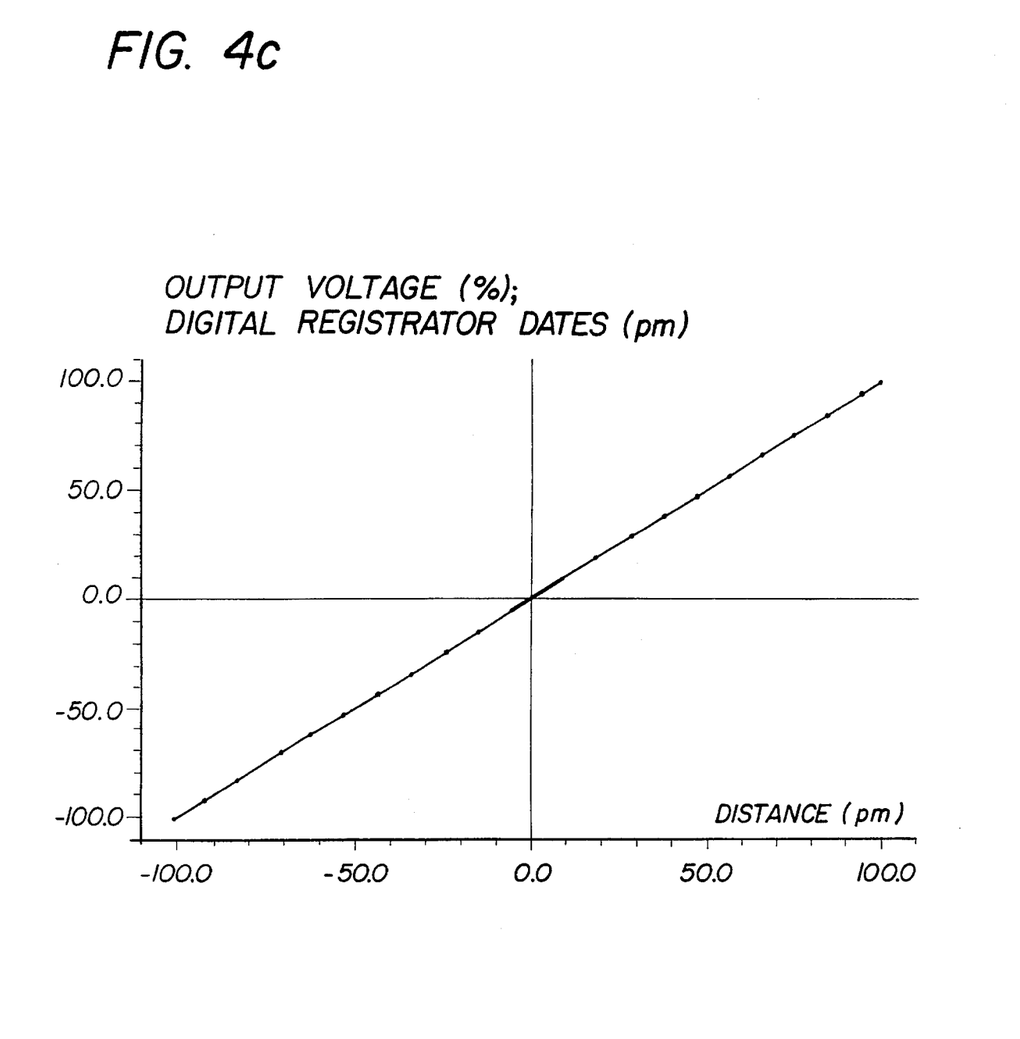
FIG. 4c shows a graph of the relationship between the output voltage and the measuring distance: the output analog signal.
Figure 4D:
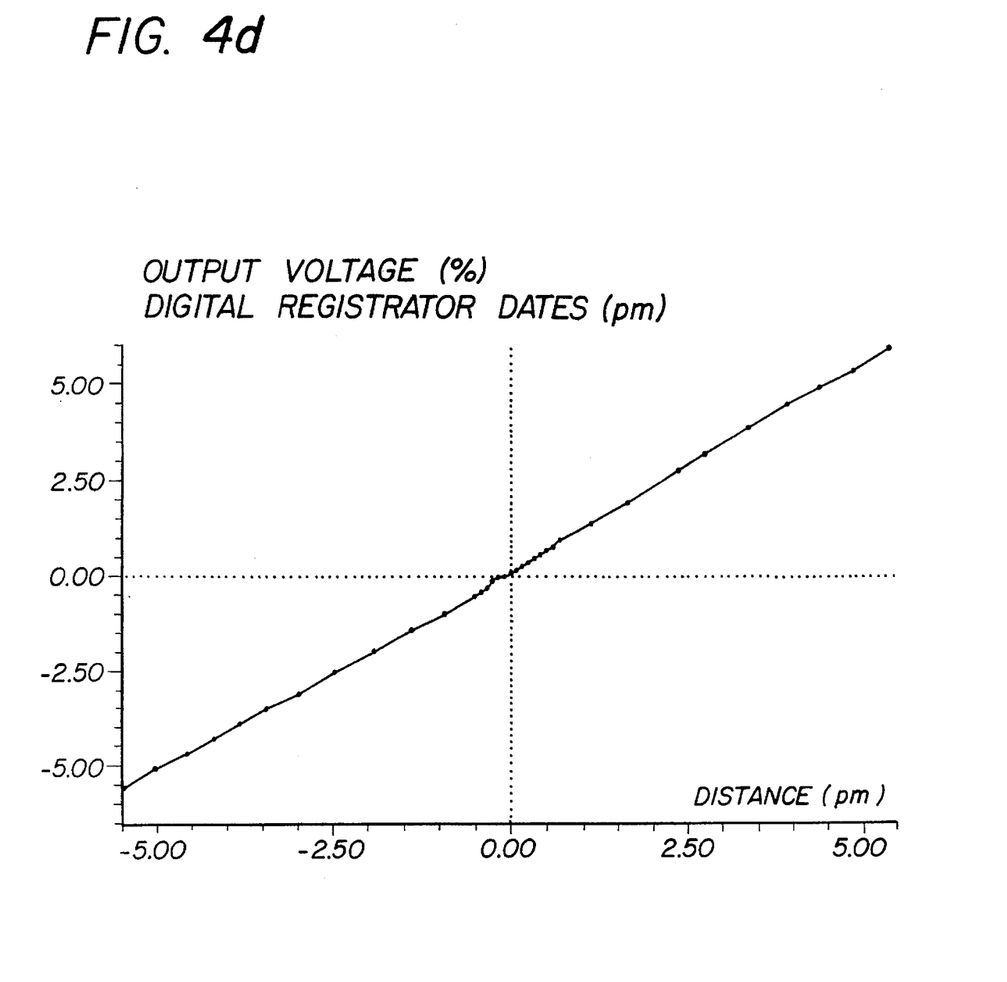
FIG. 4d shows a portion of the graph of FIG. 4c fragmented in the middle part, around Y=X=0.

FIGS. 4c and 4d are output analog signals from structure 52 (transferred to microns on the y-axis). The x-axis distance is a measurement between the target surface of the sensitive probe, relative to the stand off position (middle point of the linear range).

Figure 5:
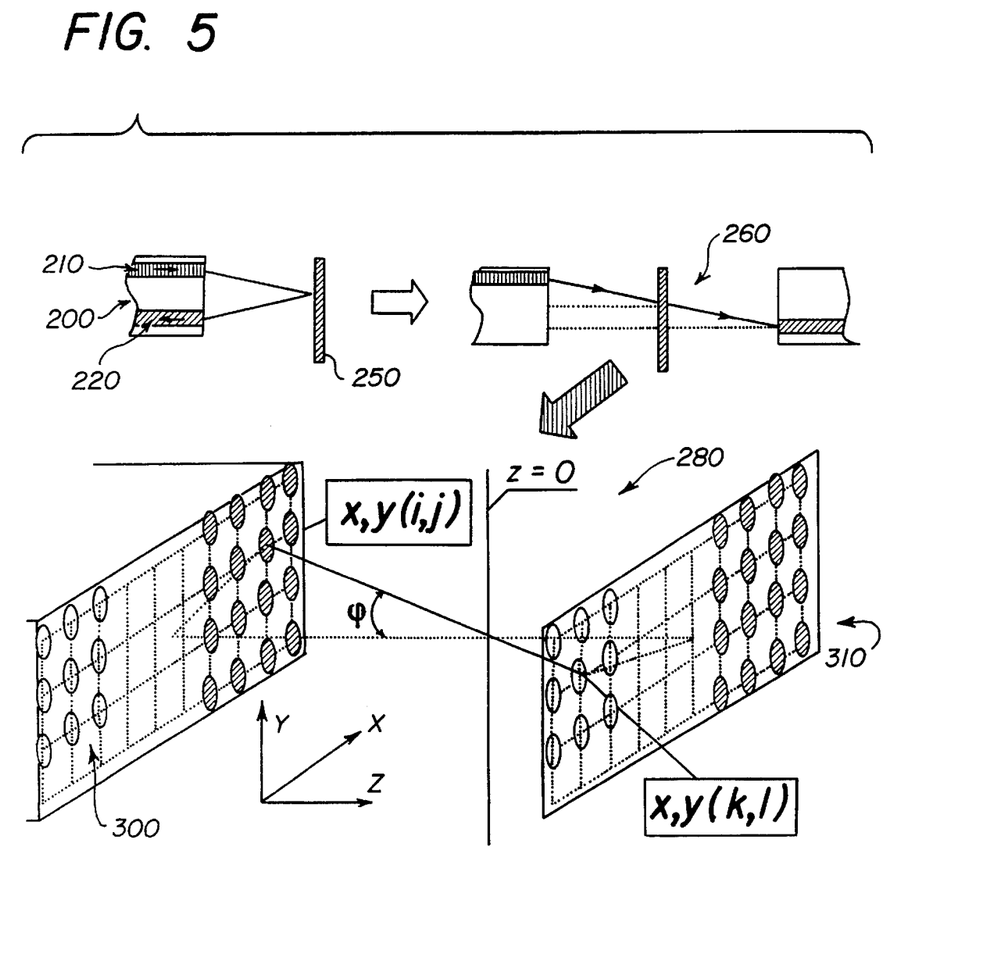
FIG. 5 shows a direct reflection model of the sensitive probe prepared for numerical analysis.

The direct reflection model is depicted in FIG. 5 showing a probe 200, a fragment of one transmitting channel 210, a fragment of one receiving channel 220 and a reflected target 250. The projection is transferred through an ideal mirror 260 and then transferred in a matrix for numerical analysis using software 280. The fiber target 300 is shown along with a transpose of the target 310. The direct reflection model is constructed such that the mirror virtual image 260 of the MFOB matrix 100 is symmetrically placed in relation to the plane XOY in point $Z_o$, with means for opening out the planes of the MFOB matrix projection.

The elementary light intensity $I1_{i,j,k,l}$ from one transmitting fiber [k,l] to another receiving fiber [i,j] depends from different parameters and can be analyzed based upon the total middle light intensity from surface S[k,l] to surface S[i,j]:

$$I1_{i,j,k,l}= I_oR_oS_{i,j}S_{k,i} \cos \theta_n[ \cos (\theta_n/2Z)^2] \cos^m (\theta_n)F^4(\theta_n)G(\theta_n)$$

$$F(\theta)=.5 \{[tg^2(\theta_n\theta_t)+SIN^2 (\theta_n-\theta_t)]/[tg^2(\theta n+\theta t)+SIN^2 (\theta_n+\theta_t)]\}$$

$$\theta_t=ARC\ SIN\ ( SIN\ (\theta_n)/n)$$

$$\cos^2 \theta_n=(2Z)^2/[(2Z)^2+hl(i-k)^\wedge 2 \cos alpha+hj(i-l)^\wedge 2 \cos beta]$$

$$G(\theta_t)=10^{(-2\gamma L)/( \cos (\theta n))}$$

Where:

$I_o$=the average intensity of the light source $S_{i,j}, S_{k,1}$=transmitting fiber receiving surface $R_o$=luminous reflectance of target $\theta_n$=inclined angle between the receiving/transmitting fiber connection line and the line normal to the target surface m=a power of the cosine function (which depends from the beam angle $\theta_{t\ R}$ distribution, for a real light source with narrow beam m>4)

$F(\theta_n)$=a function of Fresnel losses $G(\theta_t)$=a function of absorbance losses in fiber $\gamma$=an absorbance factor [1/m], [dB/km]

$\alpha,\beta$=angles included between the probe tip surface and the reflected target The light intensity for one receiving channel $I2_{(channel\ N)}$, which comes from all of the transmitting fibers 10–14 of the matrix can be calculated as a sum of elementary light intensities $I1_{i,j,k,l}$:

$$I2_{channel\ N} \Sigma\Sigma I1_{i,j,k,l}$$

From this calculation, the optimal geometric size of the MFOB 1 can be obtained using different values of distance, Z, and/or different values for the angles $\alpha$ and $\beta$:

where $$I2_{channel\ N}=\phi(Z, \alpha, \beta),$$

through numerical analysis.

The real output voltage/signal $A_1$–$A_6$ of amplifiers 34–39 is a linear function of $I_{1N}$–$I_{6N}$ and can be shown as the points in FIG. 4 as related to the approximation accuracy. Numerical results of the MFOB analysis are used for the matrix construction and for designation of MFOB geometry.

The MFOB structure as shown in FIG. 1a offers the feature of simultaneously sensing the distance, Z, the angles, α and β, the vibration and the roughness in real time (condition).

The probe tip 67 of the MFOB 1 is located by the light protector 68 ahead of the reflected target 2. Distance Zo between the reflected target 2 and the probe tip 67 can be adjusted by using the values from the electronic signals of zero or analog signals registrators.

OPERATIONAL FEATURES OF THE DEVICE

Once the device is turned on, the heating system setting is activated. The stabilization temperature chosen is equal to the optimal one for the operation (50° C., for instance). The thermosensor 62 can have different configurations. A thermoresistor is inserted in a bridge circuit on an amplifier input and is arranged inside of the thermoconductive box 65. An amplifier generates a signal for the heater 63 which is also arranged in the thermoconductive box 65. The time of the thermostabilization mode is dependent upon the volume of the box, the environmental temperature and heater power; however, does not usually exceed 10 minutes. After this function, the temperature remains relatively constant, with the heat mode holding and a small power consumption (since the box is equipped with a heat insulating cover 66). This mode of temperature stabilization is characterized not only by miniature stabilization, but also by preventing the channel ends and optical members from sweating.

Particularly important are those circuit members which introduce the most error, usually as a result of temperature change in the form of a characteristic drift (when the temperature changes, have the same stable temperature and as a result of zero drift in the device output characteristic does not exceed 0.3% per day, and the device can be used for long-time measurements).

At the start, the surface 67 is secured on a fixed support before the surface 2 at the distance $Z_o$. It is possible by setting the zero condition according to the indications of the recorders 59–61. The light sensors 28–33 and the light source 40 are chosen in such a way that they include optical filters directly on their surface so that it is not necessary to provide additional optical filters. The photodiodes and the light emitting diodes are chosen in such a way that the maximum illumination of the emitter corresponds with the maximum receiver sensitivity. As a result, the noise and light emitted out of the strict receiver spectrum do not effect the device error. This is particularly important in the case where the surface 2 is made of materials with a fluorescence effect. The most preferable range is 0.8–0.9 micrometers, where, not only metals and ceramic reflect well, but also the ferrocovered films of hard diskguides or diskets for computers.

Figure 6:
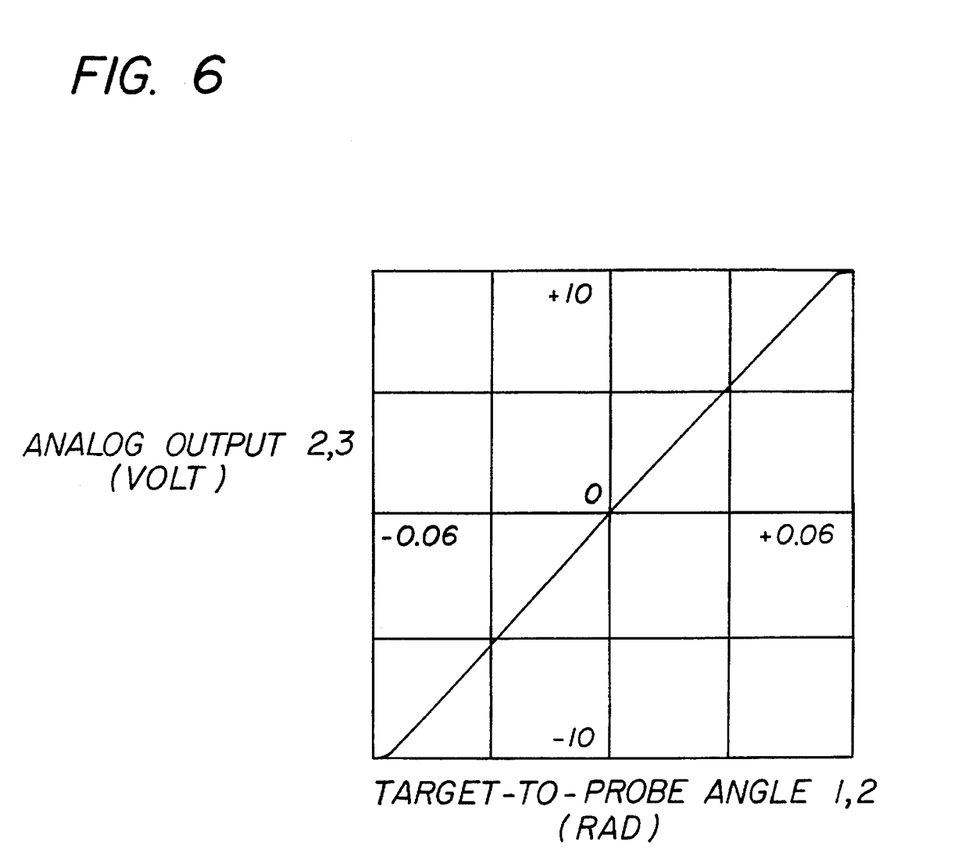
FIG. 6 shows a graph of the analog output voltage vs. the measuring angle, target to probe angle.

The light sources current $I_{LS}$ is chosen less than the maximum permissible value $I_{MAX}$ in the magnitude $dI = I_{MAX} * R_o$. This value, expressed in %, provides the same % of the permissible deviation in the reflection factor of the surface 2. The optical compensation system on the channels 15–16 operates for adjustment and tuning of the light source 40 current. FIG. 6 shows the most preferable embodiment of a simple system for the light source 40 current adjustment. The input $U_R$ is used for an initial tune-up by connecting to a device such as a reference voltage source. Signals of the channels 15,16 as shown in FIG. 4b go to the summary element 53, after amplification on amplifiers 38,39. There are two possibilities to get the characteristics F(Z) for the channels 15,16 shown in FIG. 4b, independent of Z across the entire section dZ of the working range. It is possible to adjust an effect of the channels 15 and 16 by changing the gain factor of the amplifiers 38,39 or by changing an effect of the input currents on the resistive type summer inputs of summary element 53. The signal of the summary element 53 controls the regulators 55, power amplifier 46. The light source 40 current and light beam are held on such a level that the level of the summarized signal on the summary element 53 output in the work range is constant and independent of change in the surface reflection factor, virtual surface pollution as well as the optical member degradation during a long-time operation. In this case, the optical identity ability of all channels is used. As a result, in decreasing $R_o$, for example, to 30% the signal is changed on all receiving channels accordingly. By compensation on the feed-back line from the channels 15, 16 the similar compensation condition is achieved in other channels 6–9. For generating a signal proportional only to Z displacement, the principle of averaging the signals from four channels 6–9 arranged symmetrically on the probe tip of surface of the MFOB 1 is used as shown in FIG. 1b. For instance, if the plane of probe tip surface 1 is not parallel to the surface of the reflected target 2, all signals from the amplifiers 34–37 are not equal to each other, but their sum does not depend on the angle of inclination and is proportional to $Z_o$ displacement.

The difference amplifiers 50, 51 at the presence of the angles of inclination, provide the proportional signal α, β. In this case, the MFOB symmetry provides an effect absent at the angle of inclination −α, on the channel recording the angle of inclination −β. For example, in order to measure the vibration in a large dynamic range, the outputs of the subtracting elements 50,51 and summing element 52 can be connected to the inputs of a multi-channel oscilloscope. Or, for instance, in order to reduce the effect of the slow change in the process of light transmission on fibers or an effect of power sources of illumination it is possible to give an impulse mode to the light regulators 54–58 and respectively a mode of synchronous detection in the amplifiers 34–39.

DESCRIPTION OF THE MAIN EMBODIMENT

The described embodiment of the MFOB 1 and sensing system as shown in FIG. 2 has a larger functioning capacity than the one shown in FIG. 3. This larger capacity is achieved by the presence of optical filters 17–27, by the presence of at least five light sources 40–44, which are respectively provided with amplifiers 45–49 and light regulators 54–58. In this embodiment, the channels of the MFOB third branch 3 are each connected separately to each light source. This allows individual regulation of the duration of time and intensity of light emitted by the light source 42 connected to the channel 12, the light emission being caused only from the central member 12 of the array of the MFOB end 1 shown in FIG. 5. The characteristics of the receiving channels 6– 9 and 15,16 are significantly different from the situation when light is emitted from four angular surfaces of the MFOB end 40,41,43,44. In this way, when light sources are switched on sequentially, each receiving channel is able to send five different characteristics featured by the slope of the specific sections and by the position of the maximum signal dependent on the Z, α and β parameters, to its output through amplifiers. The different characteristics are caused by the difference of the interposition between the zones of emission and the zones of reception. The calculation of such characteristics with a computer is possible according to the above methods using the light flux on the basis of summing the elementary fluxes of each pair (couple) of transmitting (i,j) and receiving fibers. For treatment with the given characteristics, in order to get output dependencies, F(Z), F(α), F(β), a multifunction board with multichannel analog-to-digital and digital-to-analog conversion for computers (—I/O board with ADC & DCA for PC's) has been used. This allows the application of only one of the "National Instrument Co." boards with a number of analog inputs—at least eleven—with a minimum of at least one digital-to-analog outputs. In this case, all main data channels from the amplifiers 34–37,38,39 come from the summary elements 52,53 and are included in ADC inputs of the I/O board. The digital treatment of the signal using and given software that performs numerical analysis, significantly improves the characteristics. For instance, through Fourier transform analysis, it is possible to by conversion to separate vibration signals with small amplitudes and without phase distortion as shown in FIG. 7.

Figure 7:
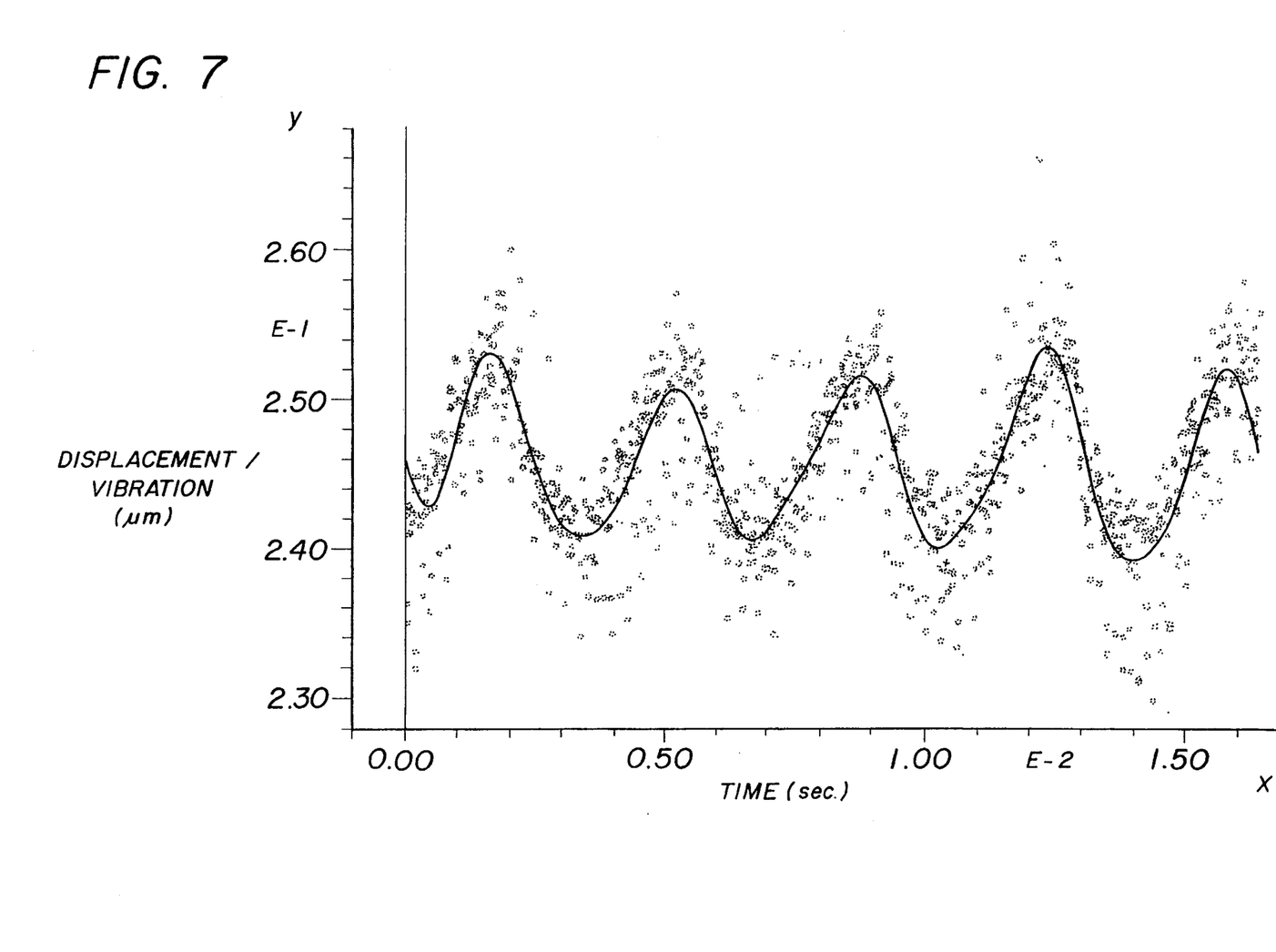
FIG. 7 shows a graph of Fourier numerical analysis normalization of vibration of all the data points obtained from the sensor and stored in the PC by the I/O board.

FIG. 7 shows graph of a real signal with the amplitude of 0.6 micrometers from the summary element 52 before and after the Fast Fourier Transform (FFT) analysis. The FFT allows for a curve fit of the real signal measurement of all points from structure 52 (optic table; measuring by sensor MFOB). The y-axis is the displacement/vibration having a range of 0.26–0.23 micrometers and the x-axis is time in seconds.

In addition, the use of the I/O board introduces individual control of the emission control and emission intensity of the light sources. This feature allows for an unlimited number of MFOB applications. During the roughness measurement at the reflecting surface 2, there is provided an evaluation at the signal relation coming from the receiving zones on the channels 15,16 when light source 40 is switched on. If, for an ideal mirror reflecting surface at the constant values Z, α and β, we have the signals A1–A6, in case of roughness presence, a light part reflected at the larger aperture angle is increased, and, consequently, the light flux on the receiving zones is redistributed. In this case, the light intensity captured by the channel 15, is reduced, but light intensity in the channels 1–4 and 16 is increased in a different magnitude. So, the signal relationship A5/A6 at the displacement of the sensitive end of the MFOB 1 reflects a root mean square roughness of the surface. The local value of the surface roughness can be obtained by calculating the signal relation: A1/(A1+A2+A3+A4), . . . , A4/(A1+A2+A3+A4), with the conditions of constant distance Z and angles of inclination α and β, or by means of other programs of numerical analysis, without changing the essence of the invention. One function of the MFOB 1 is the possibility to separate the small optical signals as a result of applying the principle of multichannel output of information about an object, and as a consequence, the possibility to operate on a small factor of reflection of the reflecting surface Z.

Figure 8:
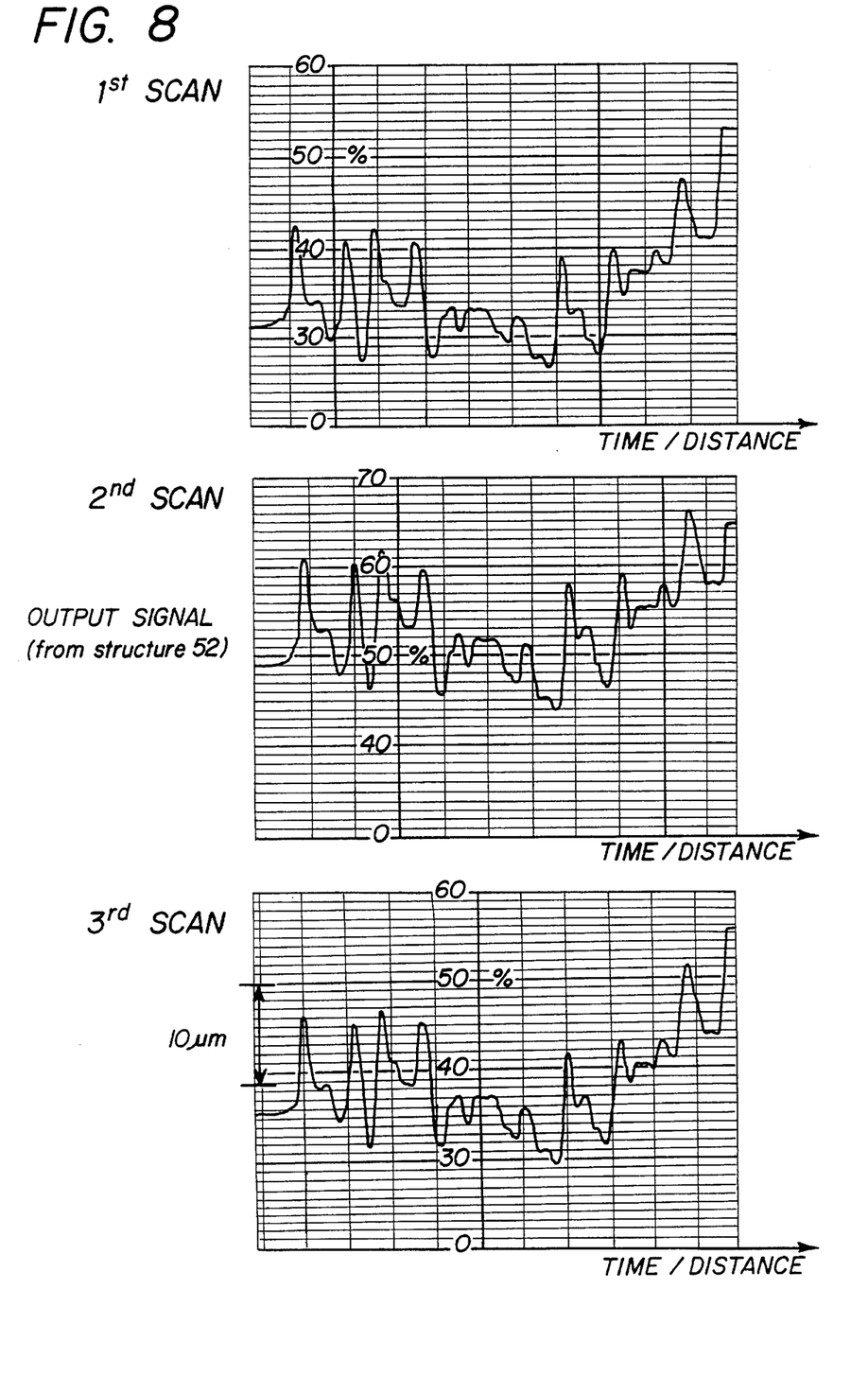
FIG. 8 shows the accuracy of the roughness target scanning.

FIG. 8 shows graphs of the results of three scannings of the same section of a surface (the black rough film) with its displacement along the X axis parallel to the surface plane of the sensitive probe end of MFOB 1. The maximum deviations from the mean level are 28 micrometers. FIG. 8 shows the high repeatability and stability of measurements, and the error for reflectivity, $R_o$=<0.3 does not exceed 1.0%.

The x-axis is time/distance and the y-axis is the output signal. This analysis reveals the accuracy of roughness target scanning—approximately 0.5 micrometer accuracy, as shown by the similarities in all three scans (small error).

Obviously, numerous modifications and variations of the preferred embodiment are possible in view of the disclosure. The structure of the MFOB, for instance, could be altered its arrangement, the number of receiving and transmitting channels. It is, therefore, to be understood that these and other modifications, and their equivalents, may be practiced within the scope of the invention, as described herein.

What is claimed is:

1. In a sensing system for simultaneously sensing at least one parameter from the group consisting of displacement, roughness and two angles between a probe tip and a light reflected target, including a fiber optic light conducting bundle having light transmitting fibers and light receiving fibers, wherein the improvement comprises:

a multichannel fiber optic bundle sensitive probe having a flat sensitive probe tip end with at least three types of transmitting and receiving ends of channels divided between three branches:
  a) a first of said three branches consisting essentially of receiving fibers directed to four sections, means for symmetrically orienting the fibers within a middle point of each section, means for connecting the fibers optically with four respective light sensors;
  b) a second of said three branches consisting essentially of receiving fibers collected into two sections, means for symmetrically orienting the receiving fibers around the receiving fibers of said first branch, means for connecting the fibers with two respective light sensors; and
  c) a third of said three branches consisting essentially of transmitting fibers symmetrically oriented and collected in at least five separated transmitting sections and connected with between one to five light sources.

2. The sensing system and multichannel fiber optic bundle sensitive probe of claim 1, wherein the means for symmetrically orienting at the probe tip end further comprises a rectangular 3*3 matrix formation having nine sections, whereby said nine sections comprise a first end of fibers having:

a center section of transmitting fibers (12) surrounded by a first supplementary section of fibers and bundled into a first separated receiving channel (16) forming a part of the second branch (5) of the multichannel fiber optic bundle;

a plurality of supplementary sections of fibers placed internally around boundaries of the nine sections to form a collection of second separated receiving channels (15) of the second branch (5) of the multichannel fiber optic bundle;

four corner sections and the center section of the 3*3 matrix being occupied by the five separated transmitting sections (10,11,12,13,14) from the third branch (3) of the multichannel fiber optic bundle;

four middle sections of the 3*3 matrix, located between two of the respective four corners of the matrix, being occupied by receiving fibers from the four channels (6,7,8,9) of the first branch (4) of the multichannel fiber optic bundle; and, a second end of said fibers of said first and second separated receiving channels of said second branch being bundled into at least two separate channels and having means for optical connection to at least two light sensors;

a second end of said fibers of said four channels of said first branch having means for optical connection to light sensors, said light sensors having means for adjusting;

a second end of said fibers of said five separated transmitting sections of said third branch being bundled into between one and five transmitting channels and having means for optical connection to respective light sources.

3. The sensing system and multichannel fiber optic bundle sensitive probe of claim 2, wherein the system further comprises a thermostabilized box for housing said second end of said fibers, said box comprising a probe module with a thermosensor and at least one heating element.

4. The sensing system and multichannel fiber optic bundle sensitive probe of claim 2, wherein the system further comprises, at least six light sensors for connection with the receiving fibers, at least six amplifiers in series with the light sensors;

at least two light sources for connection with the transmitting fibers; and a plurality of optical filters located between the receiving fibers and the sensors, and transmitting fibers and the sources.

5. The sensing system and multichannel fiber optic bundle sensitive probe of claim 4, wherein the system further comprises an electronic module in connection with the amplifiers for analyzing and controlling amplified signals, said module comprising two summary elements, two submitting elements and two light regulators connected to the receiving channels, whereby:

said two submitting elements produce two output analog signals related to two angles between the probe tip and the reflected target;

said first summary element produces an output analog signal related to the displacement;

said second summary element produces an analog signal, free from angle and disturbance influence, related to light reflectance or the roughness of the reflected target, and further including three zero or analog signal registrators electrically connected to outputs of said first summary element and to said two submitting elements, whereby said registrators include means for precisely adjusting zero positions in the measuring process and for working range testing in the electronic module.

6. The sensing system and multichannel fiber optic bundle sensitive probe of claim 5, wherein the system further comprises an input/output board card for a computer controller, having at least ten analog inputs for analog/digital converting and from between two to five analog outputs for digital to analog converting, said inputs being connected to said receiving channels and said outputs being connected to said transmitting channels.

7. The sensing system and multichannel fiber optic bundle sensitive probe of claim 6, wherein the system further comprises means for programmably controlling, measuring and analyzing data received from said channels.

* * * * *